March 31, 1970  E. A. THOMPSON  3,503,375
VALVE
Original Filed Sept. 4, 1962  6 Sheets-Sheet 1
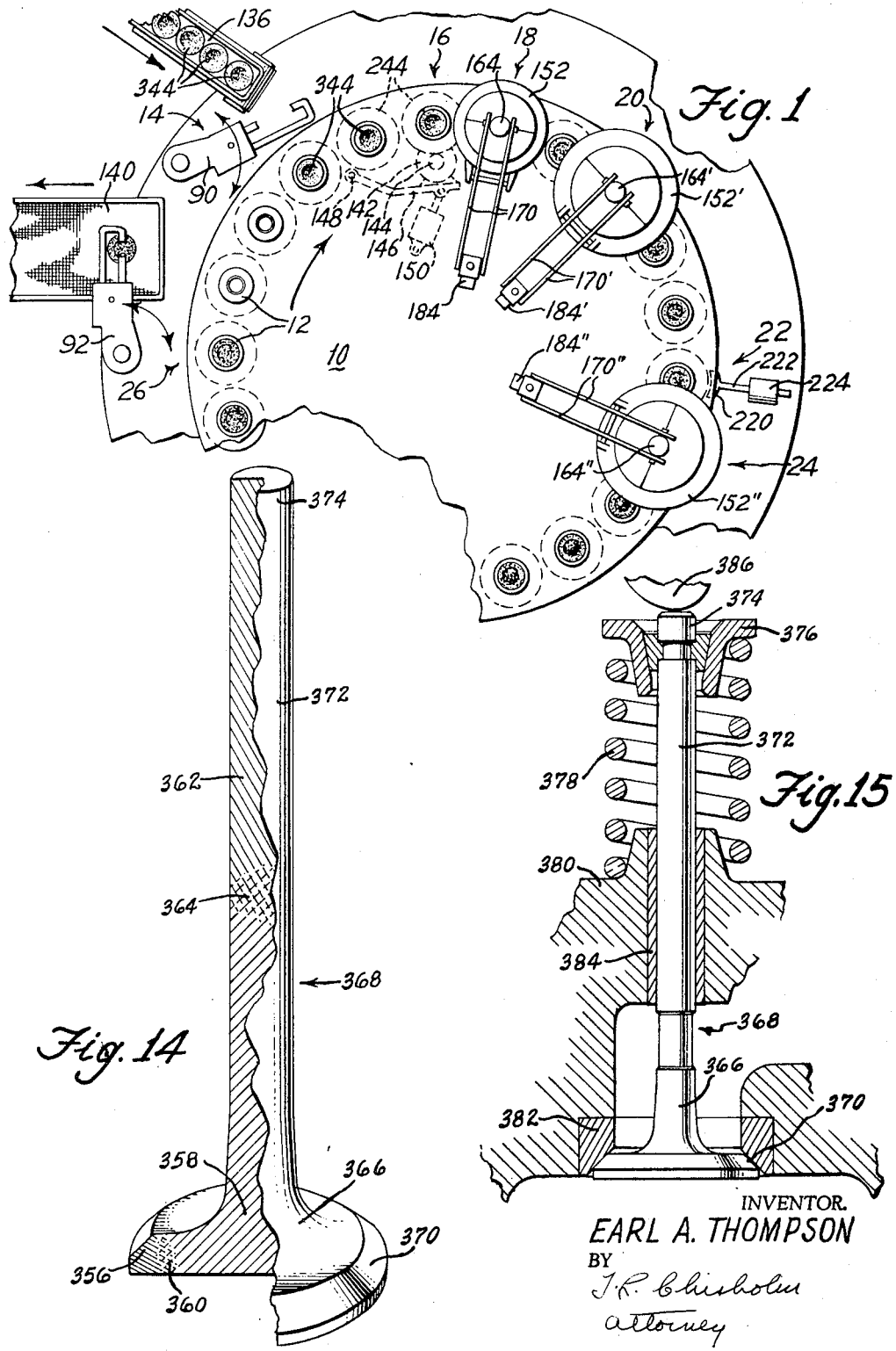
INVENTOR.
EARL A. THOMPSON
BY
J. R. Chisholm
Attorney March 31, 1970  E. A. THOMPSON  3,503,375
VALVE
Original Filed Sept. 4, 1962  6 Sheets-Sheet 2
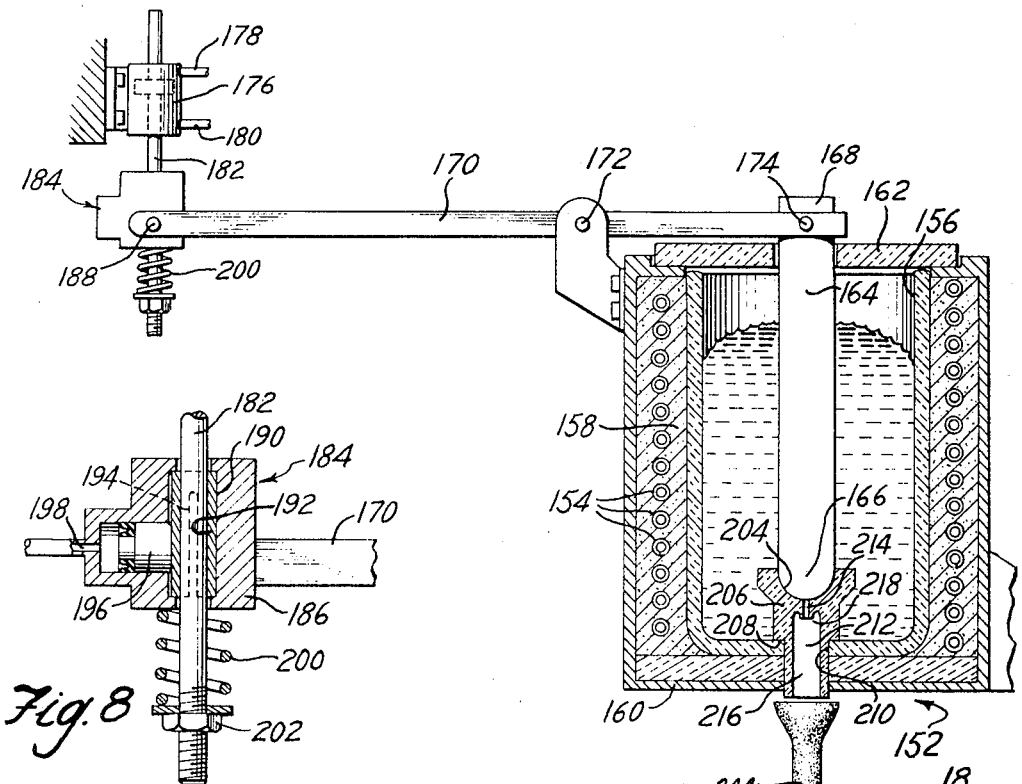
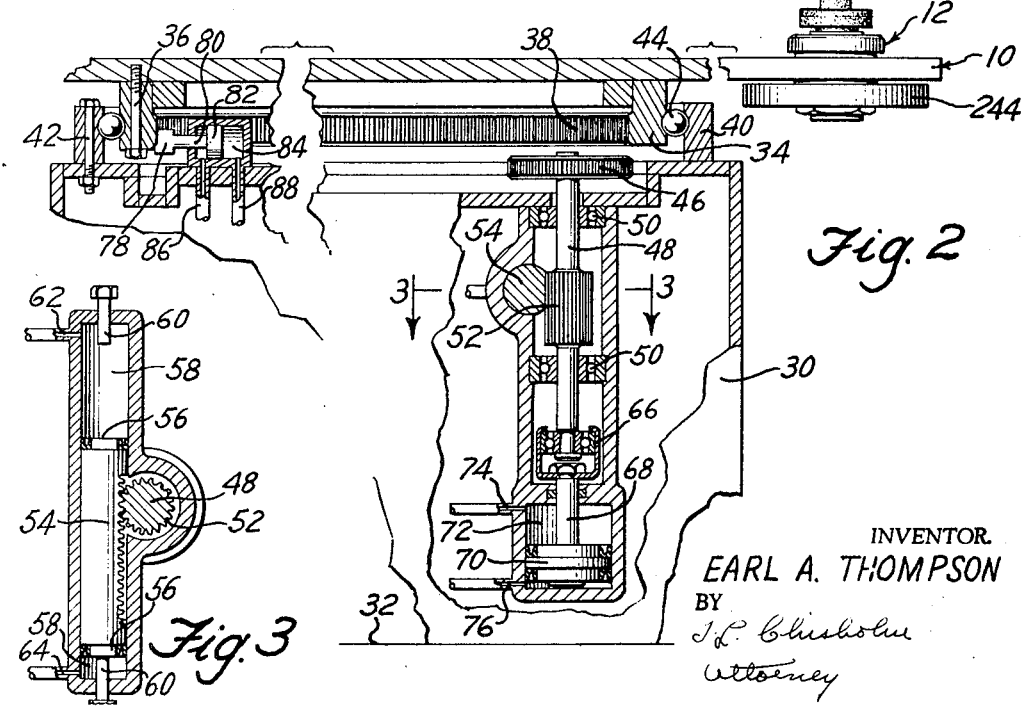
INVENTOR.
EARL A. THOMPSON
BY
J. C. Chisholm
Attorney March 31, 1970  E. A. THOMPSON  3,503,375
VALVE Original Filed Sept. 4, 1962  6 Sheets-Sheet 3

INVENTOR.
EARL A. THOMPSON
BY
J. P. Chisholm
Attorney

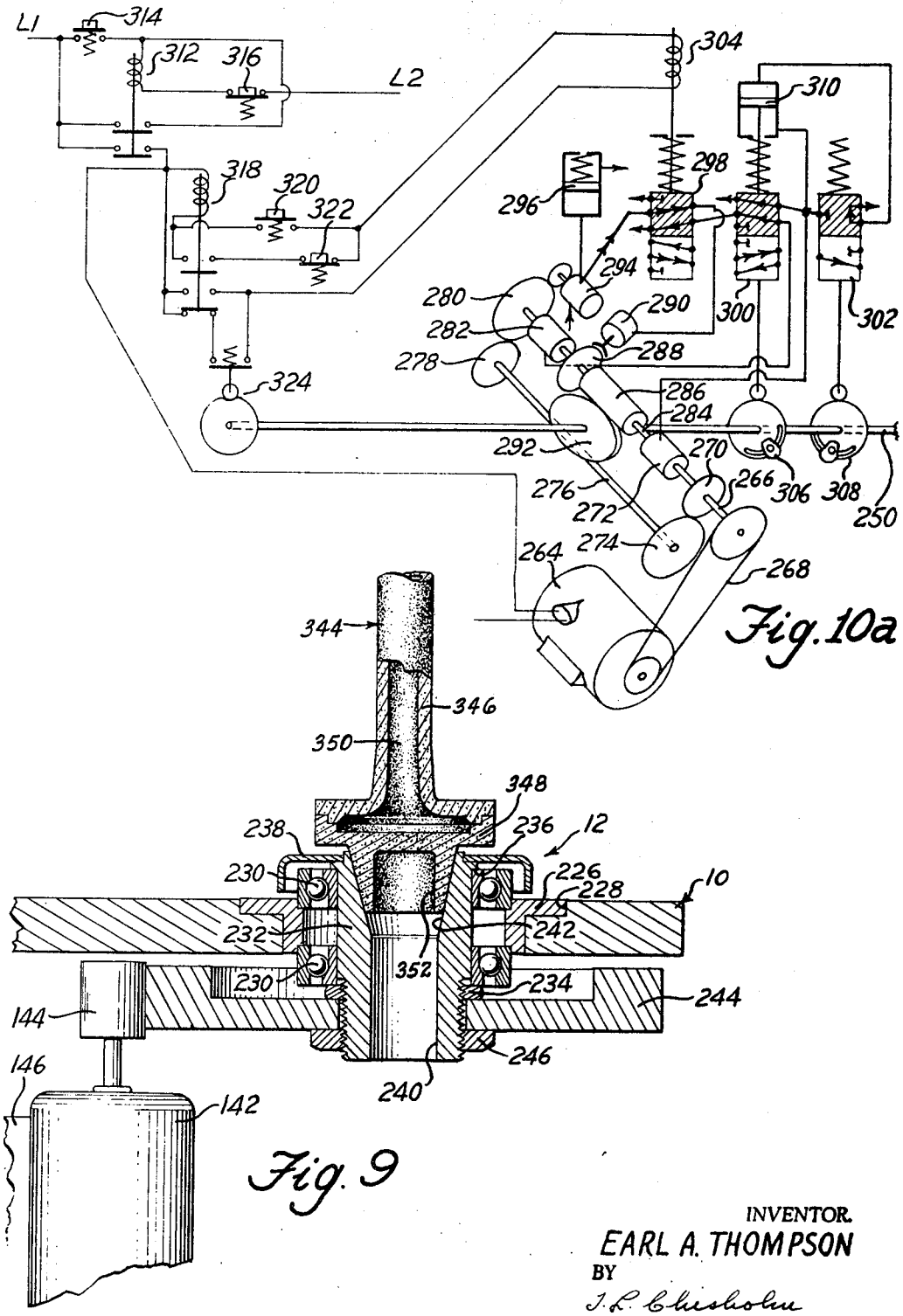

March 31, 1970     E. A. THOMPSON     3,503,375
VALVE
Original Filed Sept. 4, 1962     6 Sheets-Sheet 6
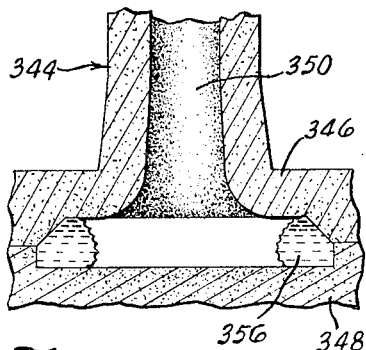
Fig. 11
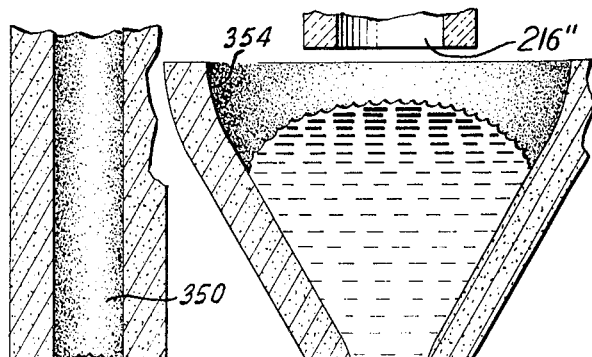
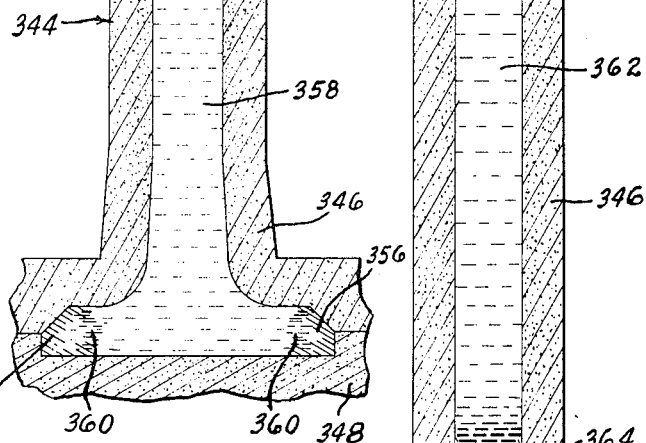
Fig. 12
Fig. 13
INVENTOR.
EARL A. THOMPSON
BY
J. L. Chisholm
Attorney United States Patent Office 3,503,375
Patented Mar. 31, 1970

3,503,375
VALVE
Earl A. Thompson, Ferndale, Mich., assignor to Earl A. Thompson Manufacturing Co., a corporation of Michigan
Original application Sept. 4, 1962, Ser. No. 221,115. Divided and this application June 17, 1968, Ser. No. 777,512
Int. Cl. F01l 3/02
U.S. Cl. 123—188                    8 Claims

ABSTRACT OF THE DISCLOSURE

A valve for an internal combustion engine is integrally cast of two or more alloys autogenously joined. The rim of the head is first cast centrifugally of one alloy, then a bonding zone is obtained by cooling the exposed surface of the metal to form a non-liquid barrier while the metal behind the barrier remains molten, then casting a different alloy to form the rest of the head and at least part of the stem. The barrier prevents turbulence and this prevents mixing of the two molten metals except in a limited zone determined by the barrier. The second alloy melts the barrier while the two alloys are not turbulent, and the two molten alloys mix in the limited zone to form a third alloy providing an autogenous bond between the first and second alloys.

The process may be repeated between the head and stem, or between parts of the stem.

---

This application is a division of my application filed Sept. 4, 1962, Ser. No. 221,115.

This invention relates to composite casting, and more particularly to method and apparatus for continuously casting improved multi-metal articles, such as exhaust valves for the combustion chambers of internal combustion engines.

While the method and apparatus of this invention are capable of producing various products having particular, but differing metallurgical characteristics in separate portions of the article, exhaust valves for combination engines aptly illustrate one such product.

Valves currently in use are subject to extremely adverse operating conditions. The head must function in temperatures above 1500° F. In certain modern automotive engines utilising high octane fuels, and it must resist corrosion from the combustion products of such leaded fuels. It must also have high impact strength under these unfavorable conditions to withstand abrupt, high seating loads. The bevelled or conical seating perimeter of the valve head, on the other hand, must be even further resistant to corrosion and metal to metal wear, but need not have the low cost, high strength and toughness characteristics of the flared head itself. The valve stem, moreover, while operating at somewhat lower temperatures than the seating area, must have additional resistance to abrasion and wear in the valve guide and particularly from the actuating cam or rocker arm.

The valve art is crowded with various proposals to meet these needs, none of which have provided ultimate solutions in the practical sense. Attainment of all the desired exhaust valve properties in a single alloy appears to be at best a prohibitively expensive compromise.

Forming the parts of the valve of separate alloy parts welded together also is expensive, and the weld joints often fall short of the desired standard. For instance, in the past an upset or extruded austenitic steel head, which has the desired performance and cost qualities, has had welded or puddled therearound a facing of expensive cobalt-base metal to form the seat. But the different coefficients of thermal expansion of these two metals obviously creates an unbalance of expansion forces at different temperatures acting on the joint between the two; and, the weld represents an interruption extending across the radial paths along which heat is conducted away from the hot center of the head to the seating area. Additionally, welding a carbon steel tip of the hardenable martensitic type to the end of the austenitic steel valve stem represents a further expensive processing step.

Accordingly, it is an object of the present invention to form improved exhaust valves inexpensively by casting suitable separate metals sequentially into the appropriate places in a mold to form an autogenously united cast valve exhibiting the desired qualities in each portion thereof without the disadvantages of welded joints.

Another object of this invention is to provide a casting method for continuously producing multi-metal articles which utilizes forces other than gravity to locate molten metal in the desired portion of the mold to form one portion of the article and also utilizes gravity to locate other molten metal in the mold to form another portion of the same article.

Another object of this invention is to provide continuous casting apparatus including means for imparting centrifugal force to metal in a mold.

Another object of this invention is to provide, in combination with a continuous centrifugal casting machine for composite casting, a mechanico-hydraulic motivator of the rotary cam and liquid column type.

Another object of this invention is to provide a cast engine valve of improved metallurgical quality.

Further objects and advantages of the present invention will be apparent from the following detailed description, with reference to the accompanying drawings in which like reference characters refer to the same parts throughout the several views, and in which:

FIGURE 1 is a general plan view showing the major components of the casting machine of this invention;

FIGURE 2 is a fragmentary sectional elevational view showing the index table and a pouring station of the machine;

FIGURE 3 is a sectional view on line 3—3 of FIGURE 2 showing details of the indexing mechanism;

FIGURE 8 is an enlarged sectional view of the compensating arrangement for the metal metering valve of a pouring station;

FIGURE 9 is an enlarged sectional view of a spindled mold holder on the index table periphery;

FIGURE 10a is a schematic view of the controls for the mechanico-hydraulic motivator for the machine of this invention;

FIGURES 11, 12 and 13 are fragmentary sectional views through a mold illustrating different steps in the casting process;

FIGURE 14 is an elevational view partly in section of a product cast according to this invention; and FIGURE 15 is a view of a product such as an internal combustion engine valve in its functional environment.

Figure 4:
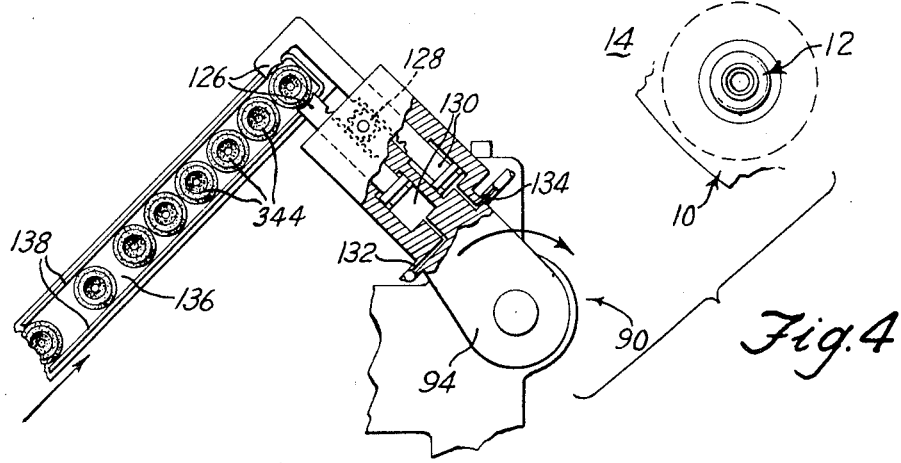
FIGURE 4 is an enlarged plan view with parts broken away showing the general scheme of the transfer arm loading means for fresh molds.

Referring to FIGURES 1 through 10b, the preferred embodiment of a composite centrifugal casting machine is disclosed. Generally, an index member such as an intermittently shiftable rotary table 10 moves mold holders 12 spaced around its periphery past a series of stations including a fresh mold loading station 14, a mold holder rotating station 16, a first metal pouring station 18, a second such station 20, a mold holder slow down station 22, a third metal pouring station 24, and a filled mold unloading station 26.

The shiftable table member 10 is supported on a base or pedestal 30 located on a foundry floor 32, see FIGURE 2. Beneath the table 10, an inner thrust bearing race 34 may be secured by fasteners 36, and the inner portion of the race may further include a ring of internal gear teeth 38. An outer bearing race 40 may be secured in a horizontal plane to the base 30 by fasteners 42 in a position to retain ball bearings 44 and thus support the table 10 for rotary motion.

Drive mechanism for the table may include a pinion 46 meshing with the gear teeth 38 of the table and driven by a vertical shaft 48 which is journalled in and axially shiftable through suitable bearings 50 in the machine base. Pinion teeth 52 integral with the shaft are engaged by the teeth of a sliding rack 54 shiftable normal thereto. A pair of U-cup sealed piston faces 56 (FIG. 3) on either end of the rack 54 reciprocate in aligned cylinders 58 to shift the rack to and fro between adjustable limit stops 60. Pressurized fluid admitted through a connection 62 at one end of the cylinder arrangement rotates the drive pinion 48 in the resetting direction, and pulsator fluid admitted to the other end through a connection 64 rotates the drive pinion to index the table member 10.

The lower end of the pinion shaft 48 has a swivel connection 66 with the upper end of the rod 68 of a piston 70 vertically slidable in a cylinder 72 in the machine base. Pressurized fluid admitted to the cylinder 72 through a connection 74 biases the shaft downwardly to disengage the drive pinion 46 from the table gear teeth 38, and hydraulic fluid admitted through a connection 76 elevates the drive pinion to engage the teeth 38. It will be noted that the pinion teeth 52 are axially elongated so as to retain their meshing engagement with the rack 54 as the shaft 48 is raised and lowered.

When the table 10 has been indexed through a small predetermined number of degrees of angular motion and the drive pinion 46 is lowered so that the rack 54 may be reset, a locking and locating device may become operative. Such a device may include a gear tooth 78 secured to the rod 80 of a piston 82 axially shiftable in a cylinder 84. Hydraulic fluid admitted to the cylinder 84 through a connection 86 retracts the piston 82 and allows rotary motion of the table 10. Hydraulic fluid admitted to the other end of the cylinder 84 through a connection 88 shifts the piston 82 to engage the gear tooth 78 with a tooth of the ring of gear teeth 38 on the table. This accurately locates and locks the table in position while metal is being poured into one of the molds, and while the drive gear 46 is lowered for resetting.

Figure 7:
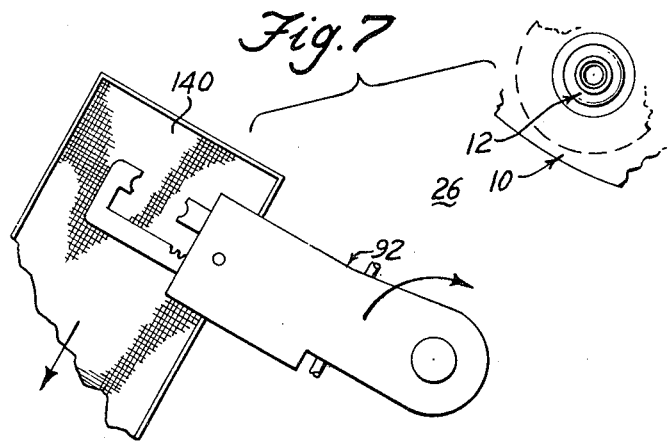
FIGURE 7 is a plan view showing the general scheme of the transfer arm unloading means for filled molds.

For loading and unloading the molds to and from the holders 12 on the shiftable member 10, a pair of transfer arms may be provided, one at the first station 14 ahead of the plurality of pouring stations and one at the final station 26 following the series of pouring stations. The loading means 90 at the first station is illustrated in FIGURE 4; the unloading means 92 at the final station is illustrated in FIGURE 7. Both means may comprise horizontally swinging transfer arms with a gripper at the outer end and an elevating mechanism at the pivot, and they may be identical in structure differing only in operational timing of moving parts—thus detailed description of one will suffice to disclose the structure of both.

Figure 5:
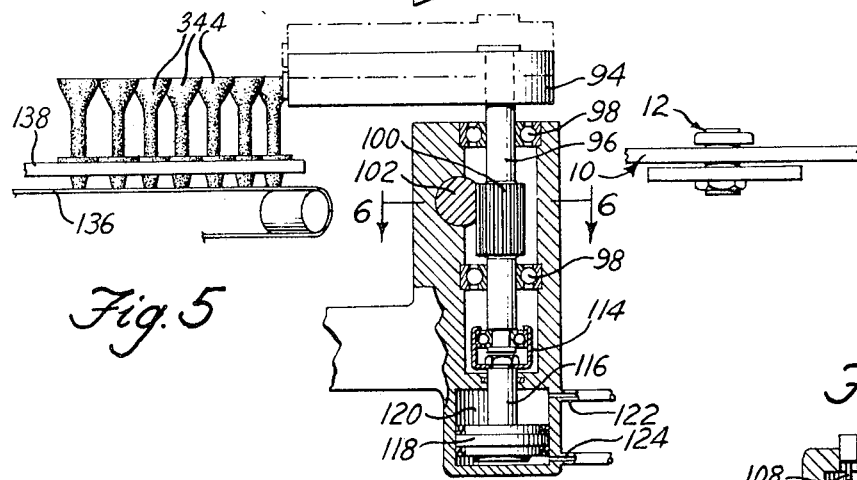
FIGURE 5 is a sectional view showing the mechanism for swinging and elevating a transfer arm.
Figure 6:
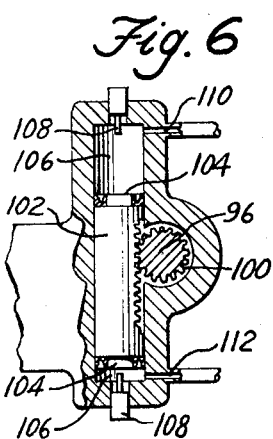
FIGURE 6 is a sectional view on line 6—6 of FIGURE 5 showing the fluid motor for swinging a transfer arm.

As can be seen in FIGURES 4–6, such a transfer arm may comprise a generally horizontally extending swinging body member 94 fixed at one end on a vertical pivot shaft 96 which is journalled in and axially shiftable through suitable bearings 98 in the machine base. Pinion teeth 100 integral with the pivot shaft are engaged by the teeth of a rack 102 shiftable normal thereto. A pair of U-cup sealed piston faces 104 on either end of the rack 102 reciprocate in aligned cylinders 106 to shift the rack to and fro between adjustable limit stops 108. Pressurized fluid admitted through a connection 110 swings the arm away from the index member 10, and pulsator fluid admitted through a connection 112 swings the arm in the opposite direction toward the index member 10, as can be understood.

The lower end of the arm pivot shaft 96 has a swivel connection 114 with the upper end of the rod 116 of a piston 118 vertically reciprocable in a cylinder 120 in the machine base. Pressurized fluid admitted to the cylinder 120 through a connection 122 biases the shaft downwardly on the machine base, and hydraulic medium admitted through a connection 124 elevates the shaft 96 and consequently lifts the arm 94 bodily upward a predetermined distance. It will be noted that the pinion teeth 100 are axially elongated so as to retain their meshing engagement with the rack 102 as the arm is raised and lowered.

On the outer end of such a transfer arm, a pair of gripper jaws 126 are shiftable in opposition to one another along the arm axis. They shift in unison by means of a common double rack and central pinion assembly 128 housed in the arm itself. Double piston-cylinder arrangement 130 in the arm serves to close the jaws when subjected to hydraulic pressure through a connection 132, and open the jaws when subjected to hydraulic pressure through a connection 134.

The transfer arms may be operated by the mechanico-hydraulic motivator (explained in detail below) in the following fashion. First, the jaws of the loading arm 90 close to grip a fresh shell mold at the supply station 14 continuously replenished with fresh molds by suitable means such as an endless belt 136. Then the loading arm is raised to lift the mold clear of guide rails 138 at the supply station so that it may swing clockwise (FIGURE 4) to position the gripped mold over a holder 12 presented at the loading station. Lowering of the arm and subsequent opening of the jaws serves to deposit the mold on the index member, which may begin its next indexing movement prior to the arm swinging counter-clockwise back to the mold supply station.

The unloading arm 92 (FIGURE 7) may move through a somewhat different cycle. As a filled mold is indexed by the member 10 to the unloading station 26, the jaws of the unloading arm close to grip the mold, crunching through any loose sand if necessary and engaging the cooling casting. Then the arm will raise bodily, lifting the casting clear of the fixture 12 free to swing counter-clockwise to a position above a shaker screen 140. At this point, the jaws may open and allow the workpiece to drop to the screen which will vibrate it away toward a subsequent operation, freeing the casting of loose sand as it goes. The unloading arm arm may then be lowered as it is returned in a clockwise direction to receive the next filled shell mold. Thus, the loading and unloading means, while identical in structure, follow different programs to render the composite casting apparatus of this invention entirely automatic and well suited to modern high volume mass production requirements.

Between the loading station 14 and the first metal pouring station 18, a mold rotating station 16 may include below the table edge a drive means such as an electric motor 142 connected to spin a fiber drive wheel 144. The motor 142 may be mounted on a support 146 pivoted to the machine base at 148 to swing the drive wheel 144 toward and from the circular path of the mold holders 12. A fluid motor 150 may be connected therewith to control such shifting in timed relation with movement of the table 10.

The trio of metal pouring stations 18, 20 and 24 may each include a bottom pour induction heated container, illustrated in the upper portion of FIGURE 2. The pouring stations may be comprised of similar elements, thus description of station 18 will provide a disclosure of all; structural elements of the pouring station 20 will be designated by similar reference numerals with the addition of a prime (') mark, and structural elements of the pouring station 24 will be designated by similar reference numerals with the addition of a double prime (") mark.

Station 18 may include a casting furnace 152 comprising an induction heating coil 154 helically and concentrically surrounding a container 156 of generally upright cylindrical configuration and may be separated therefrom by a centering and insulating layer or packed casting sand 158, and powered by a suitable source of electric current, not shown. The container 156 and heating arrangement 154 may be supported upon suitable slabs of refractory or ceramic material located upon a framework 160, and may be separately replaceable as a unit on the framework to exchange one such furnace for another of different characteristics required for casting, for instance, of a different article. A split disc-shaped cover 162 may be utilized across the top of the container to conserve the continuously generated anti-oxide atmosphere.

In addition to removably locating each casting furnace relative to the table 10, the framework 160 further supports actuating mechanism for valving arrangements constructed to meter predetermined small amounts of molten metal from the casting furnaces to a mold positioned on the table. Such a valving mechanism may comprise an elongated shiftable valve member 164 of refractory material having a semi-spherical bottom end portion 166 extending down into the container 156, and an upper portion 168 extending above the confines of the container 156. An actuating lever means 170 of the first class fulcrumed at 172 on the framework 160 may be pivotally connected at 174 with the upper portion 168 of the valve member. Oscillation of the lever 170 in a vertical plane about its horizontal fulcrum pivot axis 172 will impart small up-and-down movement to the valve member. Such motion may be effected by a fluid motor 176 fixed on the framework having an upper connection 178 through which hydraulic medium may be pulsed to lift the valve member 164, and a lower connection 180 through which hydraulic medium may be introduced to bias the valve member 164 downwardly in the container 156.

Connecting the lever 170 with the piston rod 182 of the fluid motor 176 is a compensating mechanism 184 to automatically adjust the valve actuating linkage to accommodate thermal expansion or contraction of the elongated valve rod member 164. One form of such a compensator may comprise a housing 186 including external pivot connections 188 with the lever means 170, and a central piston rod receiving aperture 190 extending therethrough in a direction normal to the axis of the pivot connection 188. A flexible sleeve 192 may be located within the aperture 190, and may be formed by longitudinal slots 194 in a metal sleeve having a relaxed, normal internal diameter only slightly larger than the diameter of the piston rod 182 of the fluid motor 176.

A plunger 196 in a laterally extending section of the housing 186 of the compensator may radially abut the split end of the sleeve 192. Hydraulic fluid pulsed through a connection 198 in an end of the housing section serves to bias the plunger 196 laterally against the resilient sleeve 192 and thus clamp the piston rod 182 in a fixed relation to the lever pivot 188. When the valve actuating mechanism is not being operated, and the fluid motor 176 is in its rest position, fluid pressure may be relieved from behind the plunger 196 whereby the inherent resiliency of the split sleeve 192 will restore its normal internal diameter, thus allowing a telescopically sliding compensating adjustment of the connection between the lever pivot 188 and the piston rod 182.

A valve seating spring 200, the tension of which may be adjusted by a nut 202 on the threaded terminus of the piston rod 182, may be employed to bias the housing 186 upwardly to thus impart a desired downward seating pressure on the valve member 164 in the container 156 when the valve is not being actuated by the fluid motor 176.

The lower rounded end 166 of the valve rod member 164 may extend downwardly into the molten metal in the container 156 and matingly engage an upwardly facing dished valve seat 204 formed in an annular support 206 also of refractory material. The support 206 may include an outer shoulder 208 separating larger and smaller outer diameter portions thereof. The smaller outer diameter portion may be snugly received in an aperture 210 in the bottom wall of the container 156 and its supporting structure, and the larger outer diameter portion may extend upwardly therefrom to position the valve seat 204 away from the container wall whereby molten metal will essentially surround the valving mechanism.

Internally, the support 206 may include a generally downwardly directed delivery port 212 having a narrow upper portion 214 communicating with the valve seat 204, and a wider lower portion 216 opening below the supporting structure 160 for the casting furnace 152. The upper and lower portions of the delivery opening may be connected by a reverse angle shoulder forming a depending or overhanging internal lip 218. Such a lip may be located in the upper portion of the support 206, within the range of the heating coil 154 and the high temperature molten metal which essentially surrounds the valving mechanism. This insures that no metal will freeze in the delivery opening and disrupt operation of the valving mechanism. The entire support 206 including the delivery opening and valve seat may be formed as a replaceable insert whereby a new unit may be substituted for a worn one with very little effort. Furthermore, since the size of the delivery opening 214 governs the rate of flow from the container 156—viscosity and static head remaining constant—the amount of metal metered in a given time may be varied simply by replacing valve seat inserts 206 to utilize the desired orifice size for the particular product being cast.

Between the pouring stations 20 and 24, the station 22 may include a brake to stop rotation of each individual mold holder. Such a device may include a brake shoe 220 secured to the end of the shiftable piston rod 222 of a fluid motor 224. When the shoe 220 is shifted by the motor 224 slowly toward the circular path of the mold holders 12, rotary motion of each holder will be stopped.

The mold holders 12, a plurality of which are positioned around the table 10, are identical in structure, and again a description of one will provide a disclosure of all. Regarding FIGURE 9, each holder 12 may be constructed as a quickly replaceable cartridge unit having an outer flanged insert section 226 insertable in a shouldered aperture 228 in the table 10. The section 226 provides a support for the outer races of a pair of bearings 230, the inner races of which support a hollow spindle 232. A nut 234 threaded on the lower end of the spindle 232 secures the bearings in thrusting relation against an upper shoulder 236. The bearings are shielded from above by a brass cover 238, and the hollow center 240 of the spindle is adapted to allow metal metered from a pouring station to fall on through witthout injuring the table 10 and holder 12 if by accident there is no mold positioned on the holder. The upper portion of the spindle center 240 is tapered outwardly at 242 to drivingly receive a mold.

Below the table 10, each spindle 232 may include a centrally apertured flywheel 244 removably secured thereon by a second nut 246 threaded on the lower end of the spindle. Rotary motion may be imparted to the spindled mold holder by engaging the spinning fiber wheel 144 directly with the flywheel 244, as can be understood, and such rotary motion will be maintained by the appropriately massive flywheel.

Figure 10B:
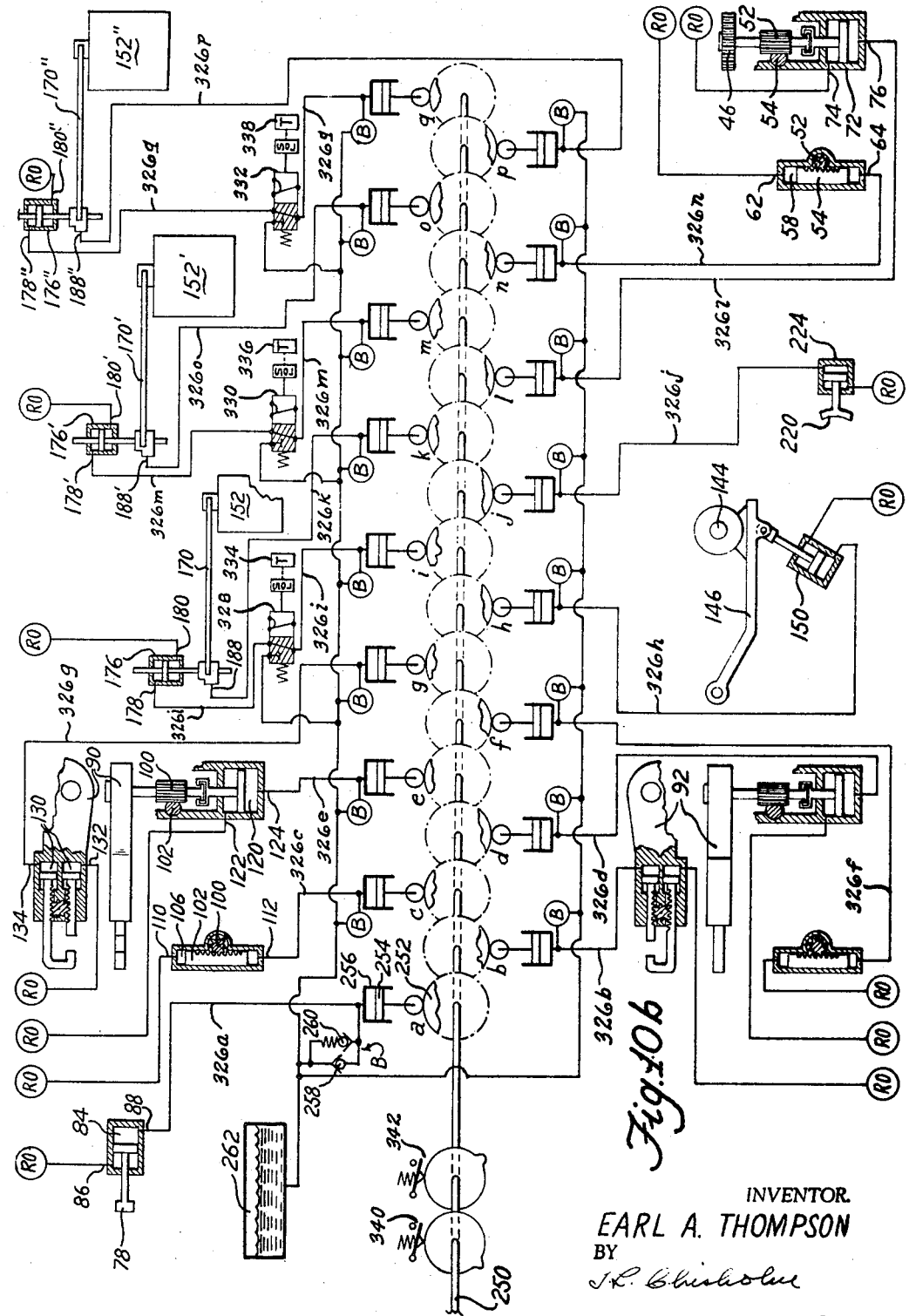
FIGURE 10b is a schematic view of the actuating portion of the mechanico-hydraulic motivator connected with the fluid motors on the casting machine.

For the purpose of giving coordinated motivation to the various fluid motors described above, there is provided a mechanico-hydraulic programming system for producing a cycle of coordinated movement, illustrated diagrammatically in FIGURES 10a and 10b. This system may be constructed as a self-contained unit having its own housing, not illustrated, which may be positioned at any convenient location on or adjacent the casting machine and connected to the various hydraulic cylinders by a suitable flexible piping. The mechanico-hydraulic drive unit comprises a master camshaft 250 carrying a plurality of cams 252, the followers of which operate the transmitter pistons 254, each of which forms a part of a liquid column type motion transfer device of which there are seventeen units shown in the diagram of FIGURE 10b. Each piston reciprocates in a cylinder 256 having a head B which contains a suitable inlet replenishing check valve 258 and a high pressure relief valve 260 both of which communicate with a low pressure oil reservoir 262 preferably formed in a housing enclosing the drive unit.

For turning the camshaft 250, a motor 264 drives an input shaft 266 of a two-speed transmission through a belt drive 268. The input shaft 266 drives a pinion 270 and also the input member of a hydraulically-engaged, spring-released clutch 272. Pinion 270 drives a gear 274 secured to a countershaft 276 which carries a pinion 278 at its opposite end. Pinion 278 drives a gear 280 and therewith constitutes a set of change speed gears. Gear 280 drives the input member of a second hydraulically-engaged, spring-released clutch 282. The driven members of clutches 272 and 282 are secured to the opposite ends of a shaft 284, having a worm 286 thereon and brake drum 288. The latter has a spring-biased hydraulic motor 290 for engaging the brake. Worm 286 drives a worm wheel 292 secured to the master camshaft 250.

For the purpose of automatically controlling the starting, stopping, and speed of the transmission, there is provided a hydraulic control pump 294 driven from gear 280, which may circulate a body of oil contained in the housing surrounding the transmission. The pump 294 may deliver to a combined accumulator and relief valve comprising a spring loaded piston 296 and also supplies oil to a bank of control valves 298, 300 and 302. In the diagrams, each valve is shown as a two-position valve, spring-biased to the position illustrated in which the connections shown in the cross-hatched rectangles are established. Single-headed arrows are used to indicate flow at reservoir pressure and double-headed arrows to indicate flow at pump delivery pressure. Each of the valves, when shifted, establishes the connections shown in the unhatched rectangles immediately below the hatched rectangles.

Valve 298 is arranged to be shifted by a solenoid 304. Valves 300 and 302 are arranged to be shifted by the adjustable cams 306 and 308, respectively, which are positioned on camshaft 250. In addition, the valve 300 has a hydraulic holding cylinder 310 which holds the valve 300 in its shifted position until it is released by the shifting of valve 302. Valve 298 in the position shown delivers pressure fluid to engage the brake 290 and also exhausts fluid to release the low speed clutch 282. When shifted, valve 298 exhausts fluid to release brake 290 and supplies pressure fluid to engage the low speed clutch 282, subject, however, to a conjoint control by the valve 300.

The latter valve, in the position illustrated, exhausts fluid to release the high speed clutch 272 and places the low speed clutch 282 under the control of valve 298. In its shifted position, valve 300, provided valve 298 has been shifted, delivers pressure fluid to engage high speed clutch 272 and exhausts fluid to release low speed clutch 282. As previously explained, the valve 302 is merely a reset valve for by-passing the holding cylinder 310 to permit valve 300 to return to its spring biased position shown in the drawings.

Thus, energization of solenoid 304 will start the camshaft rotating at slow speed. Thereafter, the cam 306 will shift the transmission to drive the camshaft at high speed, and still later the cam 308 will again shift the transmission to slow speed. So long as the solenoid 304 remains energized, the camshaft 250 will continue to rotate, first at a slow speed and then at a high speed during each revolution, controlling its own speed changes by operation of the cams 306 and 308.

For the purpose of controlling the drive motor 263 and solenoid 304, there is provided an electric control circuit connected between a pair of electric supply lines, designated L1 and L2. The circuit may include a master relay 312 of the holding type having a manual master start switch 314 and a manual master stop switch 316. Relay 312 controls the motor 264 and also a cycle control relay 318 of the holding type having a manual cycle start switch 320 and a manual cycle stop switch 322. The normally open contacts of relay 318, which are of the make-before-break type, control energization of cycle solenoid 304 directly. The normally closed contacts of relay 318 also control solenoid 304, but are in series with a cam switch 324 on the end of the camshaft 250 and arranged to be opened once during each revolution thereof. The arrangement is such that when the cycle stop switch 322 is operated at any point in the rotation of camshaft 250, relay 318 will be de-energized, but solenoid 304 will remain energized until cam switch 324 opens at the predetermined stopping point. Operation of the master stop switch 316, however, will de-energize solenoid 304 immediately, regardless of the point in the cycle and will also de-energize motor 264.

The camshaft 250 as previously mentioned drives a number of cam operated hydraulic pulsator sections designated a through g, inclusive. Each section may comprise units duplicating the single acting pulsating cylinder 256, the head B of which contains the replenishing check valve 258 and the spring closed relief valve 260. All the replenishing and relief valves are connected to a common oil reservoir 262 formed in the housing of the unit. The reservoir 262 is preferably subjected to a low, super-atmospheric pressure by a body of compressed air or other pressure maintaining arrangements. Check valves 258 allow flow from the reservoir 262 to the cylinder 256, while relief valves 260 allow flow oppositely when the cylinder pressure exceeds a certain value. Thus each of the pairs of valves 258 and 260 may be referred to as a balancing valve and serve to balance the volume of fluid in each of the liquid column section.

In order to insure proper synchronization of the driving and driven elements of each pulsator section, it is desirable to provide slightly more fluid displacement in the driving or transmitting elements 252–256 than is present in their respective fluid motors at the opposite end of the liquid column line. Thus at the end of each advancing stroke of the transmitter piston 254, a small amount of fluid will be discharged to reservoir 262 through its relief valve 260. This amount plus any amount lost by leakage will be returned to the liquid column at the end of the return stroke by the operation of the replenishing valve 258.

In FIGURE 10b there are shown several circles marked RO connected to the end of some of the motive cylinders opposite the liquid column connections. These symbols designate the return oil connections by means of which a pulsator system may be hydraulically biased so as to maintain the follower in close contact with the cam as the falling portion of the cam contour recedes from the follower. This bias is maintained by a high pressure accumulator or oil reservoir, not shown, which may be provided with a manifold whereby all of the RO connections are joined together and to the high pressure reservoir. The showing of separate return oil connections in FIGURE 10b is indicative of any suitable type of biasing pressure source, whether it be a single accumulator or multiplicity thereof. The contours of the individual cams 252 are likewise not illustrated in specific detail since they may be formed in accordance with the usual practice to cause motivation of each of the respective hydraulic motors in accordance with the particular operating cycle desired for the machine. Likewise the speed ratio between the high and low speeds of the camshaft 250, and the duration of the high speed portion of the cycle, may be selected as desired through use of the appropriate change gears 270–280 and through the adjustment of the cams 306 and 308, if desired. Of course, the two speed feature of the transmission may be omitted and the high speed clutch 272, the cams 306 and 308 and the valves 300 and 302 eliminated.

As can be seen from FIGURE 10b, pulsator section a is connected by its closed liquid column line 326a with the connection 88 of the table locating motor cylinder 84. Pulsator section b is connected by its liquid column 326b with the jaw operating fluid motor means for the unloading arm 92. Pulsator section c is connected by its liquid column 326c with the connection 112 of the motor cylinder 106 for swinging the loading arm 90. Pulsator section d is connected by its liquid column 326d with the arm elevating fluid motor for the unloading arm 92. Pulsator section e is connected by its liquid column 326e with the connection 124 of the motor cylinder 120 for elevating the loading arm 90. Pulsator section f is connected by its liquid column 326f with the arm swinging fluid motor for the unloading arm 92. Pulsator section g is connected by its liquid column 326g with the connection 134 of the jaw operating fluid motor means 130 for the loading arm 90. Pulsator section h is connected by its liquid column 326h with the fluid motor 150 for swinging the spin imparting motor against each mold holder flywheel. Pulsator section i is connected by its liquid column 326i with the connection 178 of the metal metering motor 176. Pulsator section j is connected by its liquid column 326j with the fluid motor 224 for shifting the brake 220 against each mold holder flywheel. Pulsator section k is connected by its liquid column 326k with the connection 188 of the first metering valve compensator. Pulsator section l is connected by its liquid column 326l with the connection 76 for raising the drive pinion 46 into engagement with the table gear teeth. Pulsator section m is connected by its liquid column 326m with the connection 178′ of the metal metering motor 176′. Pulsator section n is connected by its liquid column 326n with the connection 64 of the fluid motor cylinder 58 for oscillating the drive pinion 46 to drive the table. Pulsator section o is connected by its liquid column 326o with the connection 188′ of the second metering valve compensator. Pulsator section p is connected by its liquid column 326p with the connection 188″ of the third metering valve compensator. And, pulsator section q is connected by its liquid column 326q with the connection 178″ of the metal metering motor 176″.

It will be noted from FIGURE 10b that liquid column lines 326i, 326m and 326q are interrupted by three-way, two position solenoid actuated valves 328, 330 and 332, respectively, spring-biased to their normal positions in which the connections shown in the cross-hatched rectangles are established. These are liquid column disabling valves which, in the normal position shown, allow free operation of the liquid columns but, in the shifted position, establish the connections shown in the unhatched rectangles whereby the liquid columns are directly connected, or "dumped," into the low pressure reservoir 262 thus allowing the fluid motors 176, 176′ and 176″ to return to their normal positions responsive to the return bias from the source RO. This closes the metal metering valves at the pouring stations even though the cams at pulsator sections i, m and q still present rise contours to their respective followers.

The valves 328, 330 and 332 are each moved to their shifted position by timing mechanisms 334, 336 and 338, respectively, individually adjustable to determine the length of time the metal metering valves are opened, and thus governing the amount of metal metered to the molds at each of the pouring stations. Each timer is started during every cycle of the machine by suitable electric circuitry of conventional design responsive to a rotary cam activated limit switch 340. As each timer "times out" and actuates the solenoid after the metal metering valve has been opened by the cam at pulsator sections i, m or q the liquid column is disabled and the valve is closed at the adjustable, predetermined time dictated by the timer. Later in the cycle, after the pulsator cams at these stations have again presented their base circles to their followers, a second cam operated limit switch 342 may be employed to re-set the two timers and deactivate the solenoids, if desired, of course, the "fine adjustment" provided by the timers may be eliminated, and the metal metering valves may be controlled directly by the cams at the respective pulsator sections.

The mold for articles cast on the above described machine may be of the shell mold variety. A shell mold 344 for an internal combustion engine valve, for instance, may comprise an upper portion 346 and a lower portion 348 bonded together to form an internal cavity 350 defining the shape of the valve to be cast. On the bottom of the lower section of the mold, a tapered boss 352 may form a driving fit with the mating taper 242 of the spindled mold holder 12. The upper part of the mold may flare out to form a feed pocket 354 for excess metal to feed the shrink as the casting cools. It will be clear that any suitable mold may be employed according to the article being cast, and the spindled holders 12 adapted thereto.

In operation, with molten metal of the desired varieties in each of the containers 152, 152′ and 152″ at the pouring stations 18, 20 and 24, and with suitable molds in the holders 12, the composite centrifugal casting machine undergoes repeated cycles of coordinated motion responsive to the mechanico-hydraulic motivator.

Fresh shell molds are cast, assembled and then continually fed by the belt conveyor 136 to the loading station 14, where they are loaded one at a time on the table 10 by the loading arm 90. During one portion of the machine cycle, this arm first grips the mold with the jaws 126 under control of motivator section g, then raises bodily under control of motivator section e, and then swings horizontally under control of motivator section c. After the mold is thus presented above a newly presented empty holder 12, the arm lowers and the jaws thereafter open to deposit the mold on the table. The arm will next swing back to the supply station to get another mold.

Simultaneously, the unloading arm 92 goes through its above-noted cycle under control of motivator sections b, d and f to grip a filled mold, raise it out of the holder 12, swing it above the shaker screen conveyor 140, and release it.

Also, while the table 10 is stopped, the locating and locking finger 78 under control of motivator section a holds the table in its newly indexed position while the rack 54 for the index drive pinion 46 is being reset.

Furthermore, during this time, the fluid motor 150, controlled by motivator section h nudges the secondary fiber drive wheel 144 against a flywheel 244 presented at station 16 to impart spin to an empty mold; and, the fluid motor 224 controlled by motivator section j urges the brake 220 against a flywheel 244 presented at station 22 to remove spin from a partially filled mold.

Finally, during table stop time, the three valves 164, 164' and 164" at stations 18, 20 and 24 are operated by motivator sections i, m and q, respectively, to meter predetermined amounts of different molten metals to molds positioned at the respective pouring stations.

To meter metal, the valve rod 164 in the casing furnace is raised slightly from its dished seat 204 by the fluid motor 176 controlled from motivator section i of the mechanico-hydraulic motivator. While the valve rod 164 is off its seat, metal pressurized by the static head of molten metal in the pot 156 flows across the seat 204 and out the outlet opening 214 of the valve mechanism and then flows by gravity directly into the mold 344. With a given viscosity to the molten metal, a given size to the orifice 214, and a static head of metal within allowable tolerances, the quantity of metal metered from the casting furnace to the mold may be very accurately controlled by the amount of time the valve 164 is held off its seat by the mechanico-hydraulic motivator. The valve may be closed by operation of the timer controlled solenoid valve 328 for disabling the liquid column 326i which actuates the fluid motor 176.

During the other portion of the machine cycle, the table 10 may be indexed to shift each mold one step farther along the path beneath the trio of pouring stations. The drive pinion 46 is raised by the fluid motor cylinder 72 under control of motivator section i to engage with the teeth 38 of the table; thereafter, the pinion 46 is rotated by the motor cylinder 58 responsive to motivator section n.

During this latter portion of the machine cycle, of course, the loading and unloading arms are not working over the table, and the fiber drive wheel 144 and the brake 220 are idled, as are the three metal metering valves at the pouring stations. Continued rotation of the camshaft 250 thus powers and controls repeated cycles of coordinated motion of the various parts of the composite centrifugal casting machines of this invention.

The casting method of this invention carried out by the above described machine is best understood by following the travel of a given mold 344 after it is loaded on the table at station 14 and until it is unloaded therefrom at station 26. First, at station 16, the mold is spun about its vertical axis.

Then, regarding FIGURE 11, a small predetermined quantity of molten metal 356 is metered to the mold at station 18. It falls by gravity to the bottom and is thence displaced by centrifugal force to the peripheral zone of the mold defining the conical seat of the engine valve. This forms a ring of molten metal.

As the metal ring cools, its centrifugally inner, or exposed surface first forms a frozen skin which gradually thickens toward the center of the quantity. This forms a flow barrier which, when molten metal is subsequently poured onto it, prevents flow of the second molten metal into the first molten metal on the other side of the barrier.

Regarding FIGURE 12, another small predetermined quantity of a different molten metal 358 is also metered to the mold at station 20. By this time the first quantity of metal 356 is not yet frozen solid, and the second quantity 358 flows by gravity and centrifugal force against the barrier and remains in contact therewith; it fills the mold part way up the zone defining the concentric operating stem of the engine valve.

Where the two metals meet, the barrier is remelted and the two metals blend and intermingle in the space occupied by the barrier. If the first-poured metal, for instance, has a comparatively high melting point, the second metal will be cast at a temperature high enough to remelt the skin on the first metal before the temperature of the second metal falls below such a point. Depending upon the temperatures, melting points, alloy compositions, specific gravities, the amount of centrifugal force and the like, the zone of fusion 360 may be fully controlled. It will be an annular zone of a radial thickness deep enough for a thorough bond between the two metals yet limited so that none of the second poured metal 358 reaches the outer edge of the casting in the area that will be the seat of the finished cast valve.

As the blended joint cools, the upper surface of the second poured metal 358 also forms a second surface skin or barrier thereon. Burning of the mold sand bonding medium continually generates an atmosphere in the mold which inhibits oxide formations on the first two shots of metal as they cool. While the inner body of the second metal behind the barrier is still above the freezing point, however, a third amount of molten metal 362 is metered to the mold at station 24, see FIGURE 13, after the axial spin has been subtracted from the mold by the brake 220 at station 22.

This third amount of metal fills the mold up to the feed cup 354. It remelts the barrier on the upper surface of the second amount 358 and blends therewith through a juncture zone 364. This latter zone, depending upon the temperatures, melting points, alloy compositions, and the like may be controlled to provide a strong union with the depth limited, however, to a predetermined range.

Cooling of the entire casting results in a tri-metal valve, after the mold and the upper feed sprue are removed, having different metals in the portions which encounter different conditions in the valve's operational environment. Regarding FIGURE 14, the flared head portion 366 of the cast valve 368 is composed entirely of the second poured metal 358. The surrounding conical seat portion 370 is composed entirely of the first poured metal 356.

The zone 360 where these two metals blend together is superior to a weld joint, aside from the obvious cost savings, in that among other things the characteristics of one metal merge or graduate into the characteristics of the other over a significant radial extent. There is no abrupt line of demarcation therebetween as in a weld joint to interrupt thermal conduction or heat flow from the valve head to the seat, and diverse coefficients of thermal expansion do not occur in immediate side by side relationship.

The concentric operating stem portion 372 is composed entirely of the third poured amount of metal 362. The bond or junction at 364 joining the stem portion metal with the head portion metal again has the above noted advantages over a common weld joint.

Depending upon the metals chosen for the various parts of the valve, heat treatment may be desirable to develop the metallurgical qualities desired. This may involve no more than induction hardening the tip 374 of the valve stem 372. Typical examples of metals which may be employed to advantage in exhaust valves for internal combustion engines are as follows.

The first-poured metal 356 to form the conical seat portion of the valve may be a cobalt-nickel base metallic alloy. As used herein, a cobalt-nickel base alloy is one in which the sum of the cobalt and the nickel percentages by weight is above fifty percent; for instance, the two may total above fifty percent, or one or the other alone may exceed fifty percent to be balanced by smaller amounts of the other, or even to the total exclusion of the other. Such an alloy has excellent resistance to corrosion from the combustion products of leaded fuels, especially at high temperatures. Furthermore, it is highly resistant to scuffing and wear. Examples of such cobalt-nickel base alloys having these characteristics are:

|     | 356-1 | 356-2 | 356-3 | 356-4 | 356-5 |
|-----|-------|-------|-------|-------|-------|
| Co  | 65.00 | 63.00 | 45.00 | 37.00 |       |
| Ni  |       | 2.00  | 20.00 | 22.00 | 78.00 |
| Fe  | ¹1.00 | ¹1.00 | ¹3.00 | ¹3.00 | ¹1.00 |
| C   | .25   | .25   | 1.40  | 1.60  | .20   |
| Mn  |       | .60   | .60   | .50   | .80   |
| Si  | 2.70  | .60   | .30   | 1.50  | .50   |
| Cr  | 27.00 | 27.00 | 19.00 | 24.00 | 20.00 |
| W   | 4.00  |       | 4.00  | 11.00 |       |
| Mo  |       | 6.00  | 4.00  |       |       |
| Cb  |       |       | 4.00  |       |       |

¹ Max.

For the second-poured metal 358 to form the flanged head portion of the valve, an austenitic steel is preferred. Such a ferrous base alloy has sufficient alloying elements such as manganese, chromium and nickel to form an austenitic structure. Such a steel is not prohibitively expensive and has resistance to corrosion in the manner of the stainless steels. Furthermore, it has mechanical properties such as strength and toughness even in the higher temperature ranges encountered in modern heavy duty internal combustion engines. And, like the cobalt-nickel base alloy, it will not be adversely affected by any heat treatment to which the valve stem may subsequently be subjected. Examples of such austenitic-steel-alloys having these characteristics are:

|     | 358-1 | 358-2 | 358-3 | 358-4 | 358-5 |
|-----|-------|-------|-------|-------|-------|
| C   | 1.00  | .20   | 1.00  | .25   | .50   |
| Mn  | 7.00  | 1.25  | .85   | ¹.75  | .50   |
| Cr  | 21.00 | 21.00 | 15.50 | 26.00 | 15.00 |
| Ni  | 2.25  | 12.00 | 14.00 | 5.00  | 15.00 |
| Si  | ¹1.00 | 1.00  | 3.00  | ¹.75  | 1.50  |
| W   | .40   |       |       |       |       |
| Mo  |       |       |       | 2.00  |       |
| Cb  |       |       |       |       | 5.00  |
| Fe  | Balance | Balance | Balance | Balance | Balance |

¹ Max.

Finally, for the third-poured metal 362 to form the operating stem portion of the valve, a steel having sufficient carbon plus carbide stabilizers so that it will form martensite and can be even further hardened by heat treatment is preferred. In this class fall the tool steels which, even before appropriate hardening, are extremely resistant to mechanical wear from rubbing and scuffing. While not as corrosion resistant as the cobalt-nickel base alloys nor as tough at high temperatures as the austenitic steel alloys, it has wear qualities to withstand the continual rubbing by the cam, rocker arm or other valve actuator. With such steels, after an annular groove is machined on the stem of the cast valve, for a spring retainer, further hardening of the stem tip may be attained by induction hardening or other known heating and quenching steps. Examples of such hardenable steel alloys having these characteristics are:

|     | 362-1 | 362-2 | 362-3 | 362-4 | 362-5 |
|-----|-------|-------|-------|-------|-------|
| C   | .82   | .45   | 1.50  | .90   | .50   |
| Mn  | .25   | .35   | .40   | 1.00  | .80   |
| Si  | .30   | 3.25  | .35   | .35   | .35   |
| Cr  | 4.25  | 8.50  | 12.00 |       | 1.00  |
| Ni  |       | .15   | .35   |       |       |
| W   | 6.40  |       |       |       |       |
| Mo  | 5.00  |       | .90   | .50   |       |
| Va  | 1.09  |       | .50   |       | ¹1.50 |
| Co  |       |       | 3.25  |       |       |
| Fe  | Balance | Balance | Balance | Balance | Balance |

¹ Min.

These metals are given as examples only, and it will be clear that many others in each class may be employed within the scope of the defined invention depending upon the desired finished product.

FIGURE 15 illustrates a finished valve 368 in its operational environment. A spring retainer 376 is affixed to the annularly grooved valve stem. A heavy valve seating spring 378 acts between the retainer and the internal combustion engine 380 to bias the valve head 366 upwardly so that the conical seat 370 closes against a mating insert 382 fixed in the engine. The valve stem 372 is reciprocable in a tubular valve guide 384 also fixed in the engine. Downward motion of a valve actuator 386, such as a cam or rocker arm, compresses the valve spring 378 and moves the valve head downwardly away from the seat insert 382 into the combustion chamber to open the valve, as is well known, and subsequent upward motion of the actuator 386 allows the spring 378 to again seat the valve.

Thus a casting machine and method for producing an improved engine valve have been disclosed. The machine may be used for any number of divergent products requiring a first metal on an outside wall and a second metal on the inside, for it will be obvious that one or more of the pouring stations may be rendered inoperative for casting articles of less than three metals; on the other hand, more pouring stations may be provided with mold spinning and braking stations placed as desired for centrifugally casting articles of more than three metals, all within the scope of the invention.

The method of casting, while entirely suitable for producing internal combustion engine exhaust valves, also lends itself to casting divergent products. Engine valves may be continually cast at the rate of one per cycle of the machine—every several seconds. The method is very inexpensive when considered against the improved product result, and it is made possible by the controlled metering of small predetermined amounts of high melting temperature metal from a bottom pour furnace. Furthermore, the mechanico-hydraulic motivator aids in controlling the critical time lapse between successive pours of different molten metals to a given mold.

Finally, the improved metallurgical characteristics of the disclosed valve product or article meet a current need in the internal combustion engine industry.

While the above described embodiment constitutes a preferred mode of carrying out this invention, many other forms might be adopted within the scope of the actual invention, which is variously claimed as:

1. A composite metal casting taking the shape of a valve of the type having a flanged head portion including a peripheral conical seat portion and a generally coaxial operating stem portion, the head portion being formed of austenitic cast steel alloy having one coefficient of thermal expansion and having joined thereto a ring of cast cobalt-nickel base alloy having a different coefficient of thermal expansion to form the seat portion, the annular joint between the head portion and the seat portion being a zone of significant radial dimensions composed of a dissimilar alloy comprised of a metallurgical blend of the two joined alloys and having a coefficient of thermal expansion which varies in value across its radial dimension.

2. A composite metal casting taking the shape of a valve of the type having a flanged head portion including a peripheral conical seat portion, the head portion being formed of austenitic cast steel alloy having one value of thermal conductivity and having joined thereto a ring of cast cobalt-nickel base alloy having a different value of thermal conductivity, the density of the cobalt-nickel base alloy being increased over the normal as-cast density of such an alloy whereby the thermal conductivity is of increased value, and the annular joint between the two alloys being a zone of significant width several times the width of a weld joint and having a value of thermal conductivity which varies across its width.

3. A composite metal casting taking the shape of a valve of the type having a flanged head portion and a generally coaxial operating stem portion, the head portion being formed of austenitic cast steel alloy having one value of thermal conductivity and the stem portion being formed of hardenable cast steel alloy having a different value of thermal conductivity, the zone where the two alloys join being of significant axial dimensions having a variable value of thermal conductivity which merges at opposite axial boundaries of the zone with the respective value of thermal conductivity of the adjacent alloy, and the end of the stem portion remote from the head portion being materially harder from heat treatment than the remainder of the stem portion.

4. A composite metal casting taking the shape of a valve of the type having a flanged head portion including a peripheral conical seat portion and a generally coaxial operating stem portion, the head portion being formed of austenitic cast steel alloy, the seat portion being formed of cast cobalt-nickel base alloy, and the stem portion being formed of hardenable cast steel alloy, the joints between the austenitic alloy and the other alloys each being of a width several times the width of a weld joint and being marked by a mutual merging of the characteristics of one alloy into the other, and the end of the stem portion remote from the head portion being materially harder from heat treatment than the remainder of the stem portion.

5. A T-shaped valve for an internal combustion engine comprising in combination an annular rim of a first metal having first properties surrounding a generally disk-shaped head of a second metal having second and different properties, the head and rim being autogenously united by a juncture zone having the properties of a juncture zone which has been formed by pouring molten first metal into a mold having portions to form the rim and head, spinning the mold to hold the molten first metal in the rim portion while cooling the first metal to form a non-liquid barrier on its exposed surface while maintaining the metal molten adjacent the barrier; then while spinning the mold pouring molten second metal against the barrier to fill the remainder of the head portion, so that there is now a non-liquid barrier between two bodies of molten metal, then melting the barrier to form a single mass of molten metal having portions of different properties while mixing the two molten metals in the space occupied by the barrier; and then solidifying said single body of molten metal.

6. A T-shaped valve for an internal combustion engine comprising in combination an annular rim of a first metal having first properties surrounding a generally disk-shaped head of a second metal having second and different properties, the head and rim being autogenously united by a juncture zone having the properties of a juncture zone which has been formed by pouring molten first metal into a mold having portions to form the rim and head, spinning the mold to hold the molten first metal in the rim portion while cooling the first metal to form a non-liquid barrier on its exposed surface while maintaining the metal molten adjacent the barrier, then pouring molten second metal against the barrier to fill the remainder of the head portion while spinning the mold, so that there is now a non-liquid barrier between two bodies of molten metal, then melting the barrier to form a single mass of molten metal having portions of different properties while mixing the two molten metals in the space occupied by the barrier, and then solidifying said single body of molten metal.

7. A T-shaped valve for an internal combustion engine comprising in combination an annular rim of a cobalt-nickel base alloy surrounding a generally disk-shaped head of an austenitic steel alloy, the head and rim being autogenously united by a juncture zone having the properties of a juncture zone which has been formed by pouring molten cobalt-nickel alloy into a mold having portions to form the rim and head, spinning the mold to hold the molten cobalt-nickel alloy in the rim portion while cooling the cobalt nickel alloy to form a non-liquid barrier on its exposed surface while maintaining the metal molten adjacent the barrier; then while spinning the mold pouring molten austenitic steel alloy against the barrier to fill the remainder of the head portion, so that there is now a non-liquid barrier between two bodies of molten metal, then melting the barrier to form a single mass of molten metal having one portion of cobalt-nickel alloy and another portion of austenitic steel alloy while mixing the two molten metals in the space occupied by the barrier; and then solidifying said single body of molten metal.

8. A T-shaped valve for an internal combustion engine comprising in combination an annular rim of a cobalt-nickel base alloy surrounding a generally disk-shaped head of an austenitic steel alloy, the head and rim being autogenously united by a juncture zone having the properties of a juncture zone which has been formed by pouring molten cobalt-nickel alloy into a mold having portions to form the rim and head, spinning the mold to hold the molten cobalt-nickel alloy in the rim portion while cooling the cobalt-nickel alloy to form a non-liquid barrier on its exposed surface while maintaining the metal molten adjacent the barrier, then pouring molten austenitic steel alloy against the barrier to fill the remainder of the head portion while spinning the mold, so that there is now a non-liquid barrier between two bodies of molten metal, then melting the barrier to form a single mass of molten metal having one portion of cobalt-nickel alloy and another portion of austenitic steel alloy while mixing the two molten metals in the space occupied by the barrier, and then solidifying said single body of molten metal.

References Cited
UNITED STATES PATENTS

| | | |
|---|---|---|
| 1,347,542 | 7/1920 | Hilty. |
| 1,498,583 | 6/1924 | Spire. |
| 2,073,178 | 3/1937 | Rich. |
| 2,273,250 | 2/1942 | Charlton. |
| 2,664,874 | 1/1954 | Graham. |
| 3,395,747 | 8/1968 | Thompson _____ 164—95 |

WENDELL E. BURNS, Primary Examiner